(12) United States Patent
Li et al.

(10) Patent No.: US 12,444,445 B2
(45) Date of Patent: Oct. 14, 2025

(54) CONTROLLER, MEMORY DEVICE AND CONTROL METHOD FOR ADJUSTING POWER CONSUMPTION

(71) Applicant: Realtek Semiconductor Corporation, Hsinchu (TW)

(72) Inventors: Jing Li, Jiangsu Province (CN); Yongxiang Sun, Jiangsu Province (CN); Wen-Bin Wu, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 253 days.

(21) Appl. No.: 18/147,007

(22) Filed: Dec. 28, 2022

(65) Prior Publication Data

US 2023/0260554 A1     Aug. 17, 2023

(30) Foreign Application Priority Data

Feb. 14, 2022   (CN) .......................... 202210132504.3

(51) Int. Cl.
*G11C 5/14*       (2006.01)
*G11C 11/4074*    (2006.01)

(52) U.S. Cl.
CPC .......... *G11C 5/147* (2013.01); *G11C 11/4074* (2013.01)

(58) Field of Classification Search
CPC ... G11C 5/147; G11C 11/4074; G11C 7/1063; G11C 16/0483; G11C 16/03; G06F 1/26; Y02D 10/00
USPC ......................................................... 365/226
See application file for complete search history.

(56) References Cited

U.S. PATENT DOCUMENTS 11,114,124 B2 *  9/2021  Takeda ................... G11B 5/012
2022/0236754 A1 *  7/2022  Dinh ...................... G06F 1/3243

FOREIGN PATENT DOCUMENTS

| CN | 102077290 A | 5/2011 |
| CN | 110086240 A | 8/2019 |

* cited by examiner

*Primary Examiner* — Tha-O H Bui
(74) *Attorney, Agent, or Firm* — CKC & Partners Co., LLC (57) ABSTRACT

A controller located in a memory device includes a feedback regulation circuit. The feedback regulation circuit is configured to generate a feedback voltage to a power supply circuit according to a power consumption of the controller, for the power supply circuit to adjust an input voltage input to the memory device according to the feedback voltage. When the power consumption of the controller is lower, the feedback voltage is higher, so that the input voltage is lower, and when the power consumption of the controller is higher, the feedback voltage is lower, so that the input voltage is higher.

20 Claims, 5 Drawing Sheets

CONTROLLER, MEMORY DEVICE AND CONTROL METHOD FOR ADJUSTING POWER CONSUMPTION

CROSS-REFERENCE TO RELATED APPLICATION

This application claims the priority benefit of China Application serial no. 202210132504.3, filed Feb. 14, 2022, the full disclosure of which is incorporated herein by reference.

FIELD OF INVENTION

The invention relates to a controller, a memory device and a control method. More particularly, the invention relates to a controller, a memory device and a control method of adjusting the power consumption.

BACKGROUND

In recent years, memory devices have been widely used. For example, among various memory devices, solid-state drives (SSD) are often used as computer memory. However, a memory device consumes a lot of power when it is operating.

SUMMARY

An aspect of this disclosure is to provide a controller. The controller is located in a memory device. The controller includes a feedback regulation circuit. The feedback regulation circuit is configured to generate a feedback voltage to a power supply circuit according to a power consumption of the controller, for the power supply circuit to adjust an input voltage input to the memory device according to the feedback voltage. When the power consumption of the controller is lower, the feedback voltage is higher, so that the input voltage is lower, and when the power consumption of the controller is higher, the feedback voltage is lower, so that the input voltage is higher.

Another aspect of this disclosure is to provide a memory device. The memory device includes a storage circuit, a controller, and a power supply circuit. The controller, coupled to the storage circuit, is configured to access data from the storage circuit. The power supply circuit is coupled to the controller. The controller is further configured to generate a feedback voltage to the power supply circuit according to a power consumption of the controller, so that the power supply circuit adjust an input voltage input to the memory device according to the feedback voltage. When the power consumption of the controller is lower, the feedback voltage is higher, so that the input voltage is lower, and when the power consumption of the controller is higher, the feedback voltage is lower, so that the input voltage is higher.

Another aspect of this disclosure is to provide a control method, applicable to a memory device. The control method includes the following operations: generating a feedback voltage to a power supply circuit by a controller of the memory device according to a power consumption of the controller, so that an input voltage input to the controller is adjusted by the power supply circuit according to the feedback voltage; raising the feedback voltage by the controller when the power consumption decreases, so that the input voltage decreases; and decreasing the feedback voltage when the power consumption is raised, so that the input voltage is raised by the controller.

In summary, the embodiments of the present disclosure provide a controller, a memory device and a control method, under different working states of the memory device, the power supply voltage of the memory device is self-regulated through the voltage monitoring feedback inside the controller, thereby further decreasing the power consumption of the memory device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

The term "coupled" as used herein may also refer to "electrically coupled", and the term "connected" may also refer to "electrically connected". "Coupled" and "connected" may also refer to Refers to two or several elements cooperating or interacting with each other.

Figure 1:
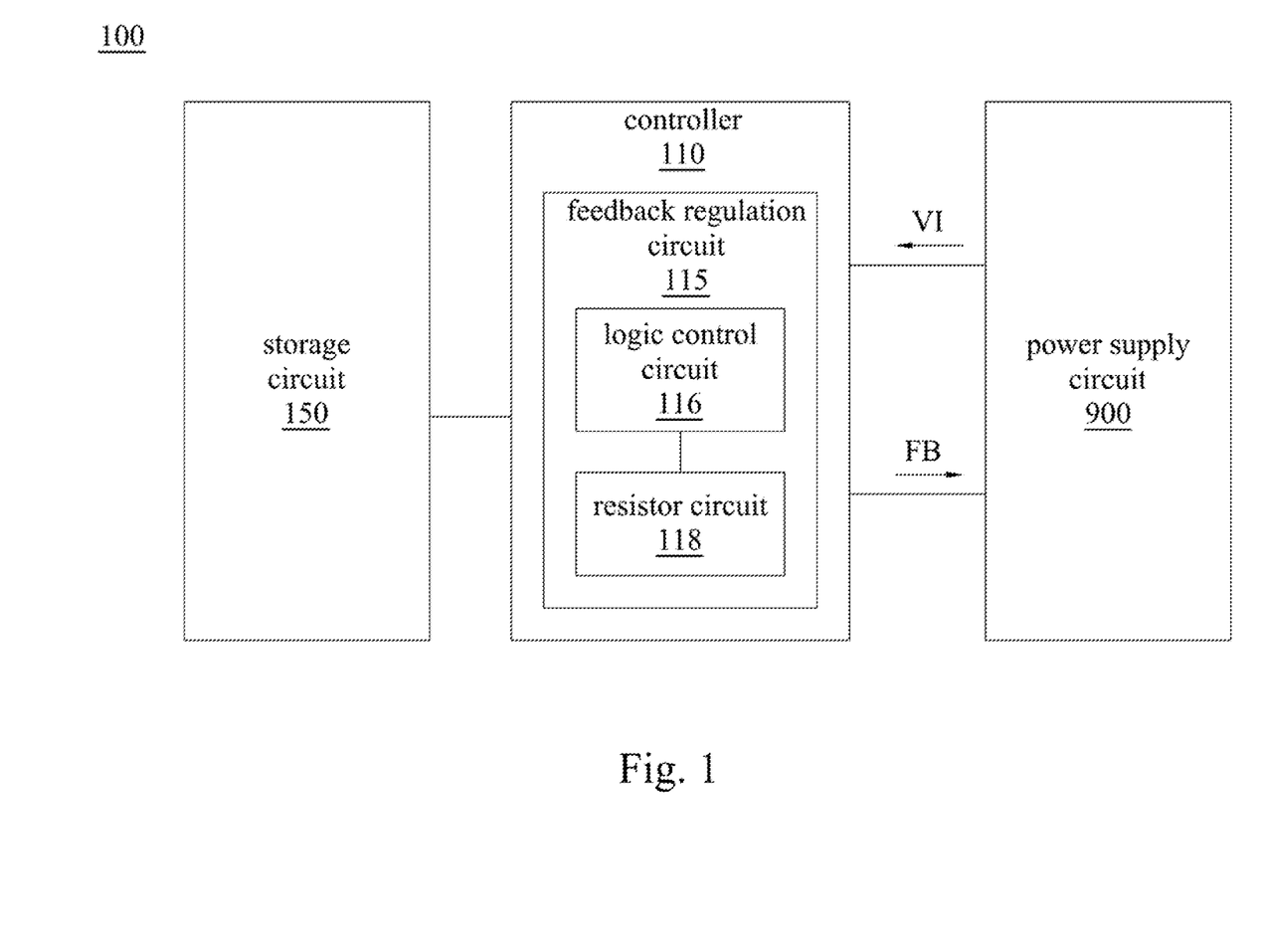
FIG. 1 is a schematic diagram of a memory device according to some embodiments of the present disclosure.

Reference is made to FIG. 1. FIG. 1 is a schematic diagram of a memory device 100 according to some embodiments of the present disclosure. In the example of FIG. 1, the memory device 100 includes a controller 110, a storage circuit 150 and a power supply circuit 900. In connection relationship, the controller 110 is coupled to the storage circuit 150. The controller 110 is coupled to the power supply circuit 900. The power supply circuit 900 is configured to provide power to the controller 110.

Operationally, in some embodiments, the storage circuit 150 is configured to store data. The controller 110 is configured to access data from the storage circuit 150, and the controller 110 is configured to receive the input voltage VI from the power supply circuit 900.

The configurations of the memory device 100 described above are for illustrative purposes only, and various configurations of the memory device 100 are within the scope of the present disclosure. The detailed operation method of memory device 100 will be explained in conjunction with FIG. 2 below.

Figure 2:
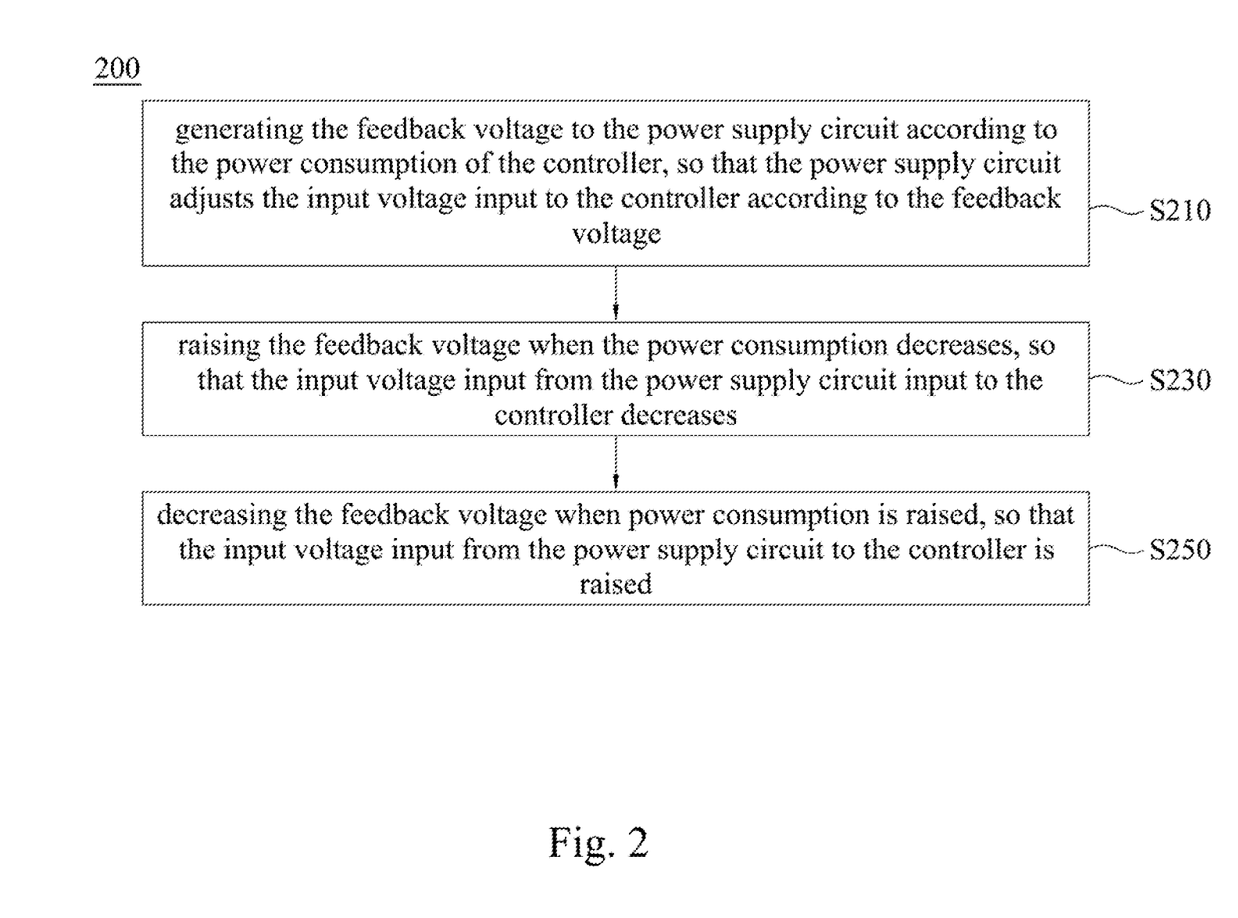
FIG. 2 is a flowchart illustrating the control method according to some embodiments of the present disclosure.

FIG. 2 is a flowchart illustrating the control method 200 according to some embodiments of the present disclosure. The control method 200 can be applied to the memory device 100 as shown in FIG. 1. Reference is made to FIG. 1 and FIG. 2 below. In some embodiments, the control method 200 is performed by the controller 110 in FIG. 1.

In operation S210, the feedback voltage is generated to the power supply circuit according to the power consumption of the controller, so that the power supply circuit adjusts the input voltage input to the controller according to the feedback voltage.

In operation S230, when the power consumption decreases, the feedback voltage is raised, so that the input voltage of the power supply circuit input to the controller decreases.

In operation S250, when the power consumption is raised, the feedback voltage decreases, so that the input voltage of the power supply circuit input to the controller is raised.

Reference is made to FIG. 1. As shown in FIG. 1, the controller 110 includes a feedback regulation circuit 115. In some embodiments, the control method 200 is performed by the feedback regulation circuit 115.

In some embodiments, the feedback regulation circuit 115 includes the logic control circuit 116 and the resistor circuit 118.

The logic control circuit 116 is coupled to the resistor circuit 118. The logic control circuit 116 is configured to adjust the resistance value of the resistor circuit 118 according to the power consumption of the controller 110 to adjust the feedback voltage FB input to the power supply circuit 900.

For example, in some embodiments, the power consumption of the controller 110 is divided into five power consumption levels. Each power consumption level corresponds to a different power supply state. In one of the embodiments, the power consumption 100% corresponds to the power consumption level 0 and the power supply state 0, and this is the case with the highest power consumption. The power consumption greater than 80% and less than 100% corresponds to the power consumption level 1 and the power supply state 1. The power consumption greater than 60% and less than 80% corresponds to the power consumption level 2 and the power supply state 2. The power consumption is greater than 20% and less than 60%, corresponding to the power consumption level 3 and the power supply state 3. The power consumption less than 20% corresponds to the power consumption level 4 and the power supply state 4. The above-mentioned power consumption levels and power supply states are only for illustrative purposes only, and the embodiments of the present disclosure are not limited thereto.

In some embodiments, the power consumption levels correspond to different input voltage levels respectively. For example, the input voltage level corresponding to the power consumption level 0 is 100% of the standard working voltage. The input voltage level corresponding to the power consumption level 1 is 98% of the standard working voltage. The input voltage level corresponding to the power consumption level 2 is 96% of the standard working voltage. The input voltage level corresponding to the power consumption level 3 is 94% of the standard working voltage. The input voltage level corresponding to the power consumption level 4 is 80% of the standard working voltage. The above-mentioned input voltage levels are for illustrative purposes only, and the embodiments of the present disclosure are not limited thereto.

In some embodiments, when the power consumption level of the controller 110 in FIG. 1 changes, the logic control circuit 116 adjusts the resistance value of the resistor circuit 118 according to the power consumption level of the controller 110. When the resistance value of the resistor circuit 118 changes, the feedback voltage FB changes accordingly. When the feedback voltage FB changes, the input voltage VI from the power supply circuit 900 also changes accordingly.

Figure 3:
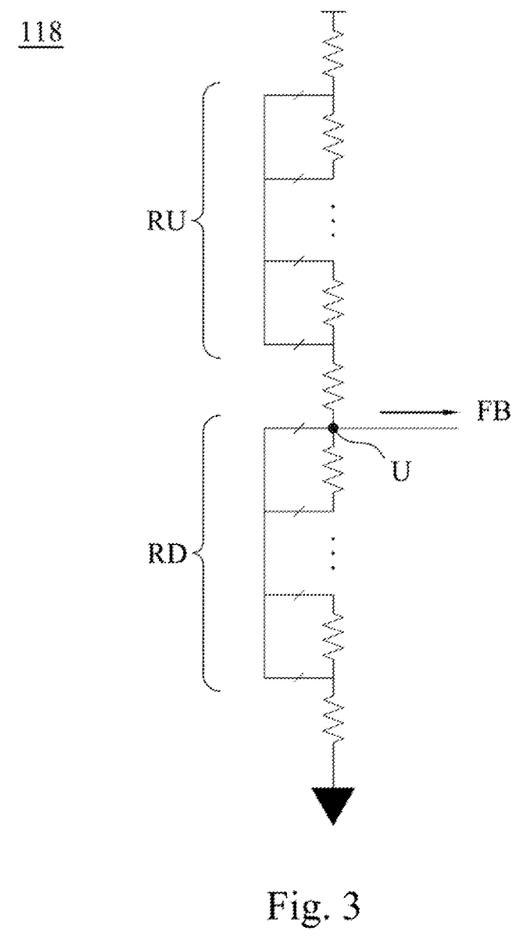
FIG. 3 is a schematic diagram illustrating the resistor circuit according to some embodiments of the present disclosure.

Reference is made to FIG. 3. FIG. 3 is a schematic diagram illustrating the resistor circuit 118 according to some embodiments of the present disclosure. As illustrated in FIG. 3, in some embodiments, the resistor circuit 118 in FIG. 1 includes a variable resistor RU and a variable resistor RD. One end of the variable resistor RU is configured to receive the voltage delivered by the power supply circuit 900. The other end of the variable resistor RU is coupled to output end U. One end of the variable resistor RD is coupled to the output end U, and the other end of the variable resistor RD is grounded. The output end U outputs the feedback voltage FB.

In some embodiments, when the power consumption of the controller 110 in FIG. 1 decreases, for example, when the power consumption level is changed from level 0 to level 1, the logic control circuit 116 determines that the input voltage level must be reduced from 100% of the standard working voltage to 98% of the standard working voltage. The logic control circuit 116 adjusts the resistance value of the resistor circuit 118 in FIG. 1 to change the feedback voltage FB.

Figure 4:
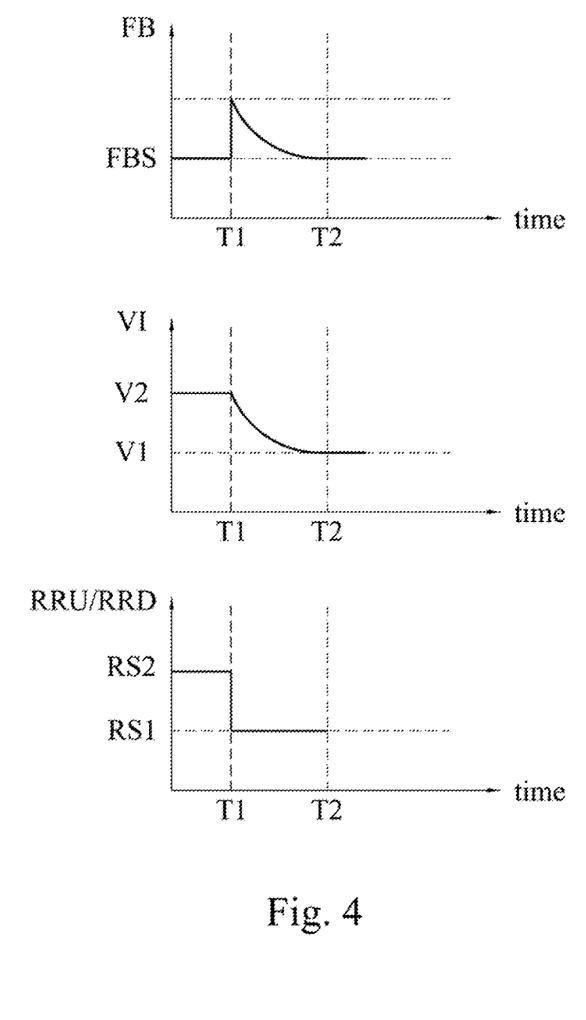
FIG. 4 is a schematic diagram illustrating an operation according to some embodiments of the present disclosure.

Reference is made to FIG. 4. FIG. 4 is a schematic diagram illustrating an operation according to some embodiments of the present disclosure. When the ratio value of the resistance value of the variable resistor RU relative to the resistance value of the variable resistor RD decreases, the feedback voltage FB will be raised to higher than the standard feedback voltage in a short time before the input voltage VI has changed. When the power supply circuit 900 determines that the feedback voltage FB is raised above the standard feedback voltage, the power supply circuit 900 performs adjustment according to the raised the feedback voltage FB so that the input voltage VI decreases. When the input voltage VI decreases, the feedback voltage FB decreases without further changes in the resistance value of the resistor circuit 118. The power supply circuit 900 continues decreasing the input voltage VI until the feedback voltage FB decreases to the standard feedback voltage.

As shown in FIG. 4, at the time point T1, the ratio value of the resistance value RRU of the variable resistor RU relative to the resistance value RRD of the variable resistor RD decreases from the ratio value RS2 to the ratio value RS1, and the feedback voltage FB is raised to be above the standard feedback voltage FBS at time point T1. From the time point T1 to the time point T2, the feedback voltage FB gradually decreases to return to the standard feedback voltage FBS, and the input voltage VI decreases from the voltage V2 to the voltage V1.

Figure 5:
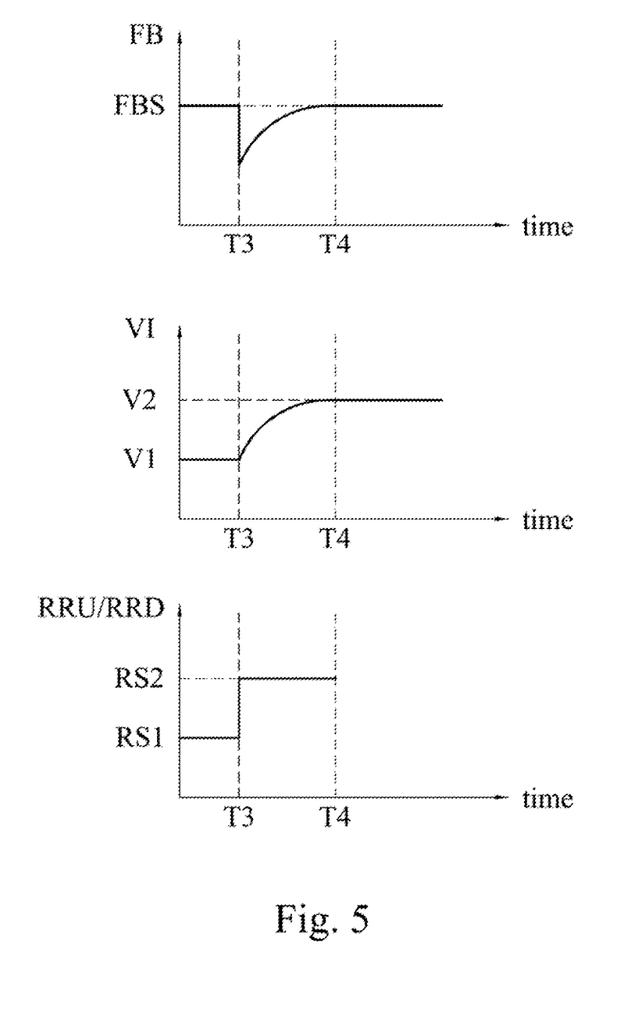
FIG. 5 is a schematic diagram illustrating another operation according to some embodiments of the present disclosure.

In another embodiment, when the power consumption of the controller 110 in FIG. 1 rises, for example, when the power consumption level is changed from level 1 to level 0, the logic control circuit 116 determines that the input voltage level must be increased from 98% of the standard working voltage to 100% of the standard working voltage, the logic control circuit 116 adjusts the resistance value of the resistor circuit 118 in FIG. 1 to change the feedback voltage FB. Reference is made to FIG. 5 at the same time. FIG. 5 is a schematic diagram illustrating another operation according to some embodiments of the present disclosure. When the ratio value of the resistance value of the variable resistor RU relative to the resistance value of the variable resistor RD is raised, the feedback voltage FB will decrease to be lower than the standard feedback voltage in a short time under the condition that the input voltage VI has not changed. When the power supply circuit 900 determines that the feedback voltage FB is decreased to be below the standard feedback voltage, the power supply circuit 900 performs adjustment according to the decreased feedback voltage value FB so that the input voltage VI is raised. When the input voltage VI is raised, the feedback voltage FB is raised without further changes to the resistance value of the resistor circuit 118. The power supply circuit 900 continues to raise the input voltage VI until the feedback voltage FB is raised to the standard feedback voltage.

As illustrated in FIG. 5, at time point T3, the ratio value of the resistance value RRU of the variable resistor RU relative to the resistance value RRD of the variable resistor RD is raised from the ratio value RS1 to the ratio value RS2, and the feedback voltage FB decreases below the standard feedback voltage FBS at time point T3. From the time point T3 to the time point T4, the feedback voltage FB is gradually raised to return to the standard feedback voltage FBS, and the input voltage VI is subsequently raised from the voltage V1 to the voltage V2.

In some embodiments, the voltage FB, the resistance value of the input voltage VI and the ratio value RRU/RRD of the resistance value RRU of the variable resistor RU relative to the resistance value RRD of the variable resistor RD in FIG. 4 and FIG. 5 (that is, the resistance ratio value) change gradually, which is more gentle than the changes shown in FIG. 4 and FIG. 5.

Reference is made back to FIG. 3. In some embodiments, the feedback voltage FB, the variable resistor RU, the variable resistor RD, and the input voltage VI operate according to the following formula (1):

$$(\text{feedback voltage } FB) \times \left(1 + \frac{\text{resistance value of variable resistor } RU}{\text{resistance value of variable resistor } RD}\right) = \text{input voltage } VI,$$ formula (1).

In the above formula (1), the controller 110 gradually adjusts the resistance value of the resistor circuit 118 to make the feedback voltage FB change instantaneously, and the power supply circuit 900 adjusts the input voltage VI to make the feedback voltage FB return to the standard feedback voltage FBS.

In some embodiments, the resistance value of the variable resistor RU and the variable resistor RD in FIG. 3 can be changed by controlling the conduction or non-conduction of the switch.

The above-mentioned logic control circuit 116 and resistor circuit 118 are for illustrative purposes, and various feedback voltage adjustment methods are within the embodiments of the present disclosure.

In the embodiments mentioned above, when the feedback voltage FB changes, the power supply circuit 900 adjusts the input voltage VI until the feedback voltage FB returns to the standard feedback voltage.

In summary, the embodiments of the present disclosure provide a controller, memory device and control method, the working state of the controller is automatically monitored through the logic control circuit. According to the different power consumption of the controller, the resistance is adjusted by the divider resistance of the resistor circuit to change the feedback voltage, so that the power supply circuit outputs different input voltages to the memory device to further decrease the power consumption of the memory device.

Various functional elements are disclosed herein. To those of ordinary skill in the art, functional elements may be implemented by electrical circuits, whether it is a dedicated circuit, or a general-purpose circuit operating under the control of one or several processors and coded instructions.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A controller, located in a memory device, comprising:
   a feedback regulation circuit, configured to generate a feedback voltage to a power supply circuit according to a power consumption of the controller, for the power supply circuit to adjust an input voltage input to the memory device according to the feedback voltage;
   wherein when the power consumption of the controller is lower, the feedback voltage is increased to be higher than a standard feedback voltage, and then the feedback voltage decreases to the standard feedback voltage as the input voltage decreases to a first voltage level, and when the power consumption of the controller is higher, the feedback voltage is decreased to be lower than the standard feedback voltage, and then the feedback voltage increases to the standard feedback voltage as the input voltage increases to a second voltage level.

2. The controller of claim 1, wherein the power consumption comprises a plurality of power consumption levels, the input voltage comprises a plurality of input voltage levels, and each of the plurality of power consumption level correspond to one of the plurality of input voltage levels.

3. The controller of claim 1, wherein the feedback regulation circuit further comprising:
   a resistor circuit, wherein when the power consumption changes, a resistance value of the resistor circuit changes, so as to change the feedback voltage.

4. The controller of claim 3, wherein the feedback regulation circuit further comprises:
a logic control circuit, is coupled to the resistor circuit, configured to adjust the resistance value of the resistor circuit according to the power consumption, so as to adjust the feedback voltage.

5. The controller of claim 3, wherein the resistor circuit further comprises:
a first variable resistor; and
a second variable resistor, connected to the first variable resistor;
wherein when the power consumption of the controller is higher, a ratio value of a first resistance value of the first variable resistor relative to a second resistance value of the second variable resistor is raised, so that the feedback voltage decreases, and when the power consumption of the controller is lower, the ratio value of the first resistance value of the first variable resistor relative to the second resistance value of the second variable resistor decreases, so that the feedback voltage is raised.

6. The controller of claim 5, wherein a first end of the first variable resistor is configured to receive the input voltage, and a second end of the first variable resistor is coupled to an output end, wherein a first end of the second variable resistor is coupled to the output end, and a second end of the second variable resistor is grounded, wherein the output end outputs the feedback voltage.

7. A memory device, comprising:
a storage circuit;
a controller, coupled to the storage circuit, configured to access data from the storage circuit;
a power supply circuit, coupled to the controller;
wherein the controller is further configured to generate a feedback voltage to the power supply circuit according to a power consumption of the controller, so that the power supply circuit adjust an input voltage input to the memory device according to the feedback voltage;
wherein when the power consumption of the controller is lower, the feedback voltage is increased to be higher than a standard feedback voltage, and then the feedback voltage decreases to the standard feedback voltage as the input voltage decreases to a first voltage level, and when the power consumption of the controller is higher, the feedback voltage is decreased to be lower than the standard feedback voltage, and then the feedback voltage increases to the standard feedback voltage as the input voltage increases to a second voltage level.

8. The memory device of claim 7, wherein the power consumption comprises a plurality of power consumption levels, the input voltage comprises a plurality of input voltage levels, and each of the plurality of power consumption levels correspond to one of the plurality of input voltage levels.

9. The memory device of claim 7, wherein the controller further comprises:
a feedback regulation circuit, comprising:
a resistor circuit, wherein when the power consumption changes, a resistance value of the resistor circuit changes, so as to change the feedback voltage.

10. The memory device of claim 9, wherein the feedback regulation circuit further comprises:
a logic control circuit, coupled to the resistor circuit, configured to adjust the resistance value of the resistor circuit according to the power consumption, so as to adjust the feedback voltage.

11. The memory device of claim 9, wherein the resistor circuit further comprises:
a first variable resistor; and
a second variable resistor, connected to the first variable resistor;
wherein when the power consumption of the controller is higher, a ratio value of a first resistance value of the first variable resistor relative to a second resistance value of the second variable resistor is raised, so that the feedback voltage decreases, and when the power consumption of the controller is lower, the ratio value of the first resistance value of the first variable resistor relative to the second resistance value of the second variable resistor decreases, so that the feedback voltage is raised.

12. The memory device of claim 11, wherein a first end of the first variable resistor is configured to receive the input voltage, and a second end of the first variable resistor is coupled to an output end, wherein a first end of the second variable resistor is coupled to the output end, and a second end of the second variable resistor is grounded, wherein the output end outputs the feedback voltage.

13. A control method, applicable to a memory device, comprising:
generating a feedback voltage to a power supply circuit by a controller of the memory device according to a power consumption of the controller, so that an input voltage input to the controller is adjusted by the power supply circuit according to the feedback voltage;
raising the feedback voltage by the controller when the power consumption decreases, so that the input voltage decreases; and
decreasing the feedback voltage by the controller when the power consumption is raised, so that the input voltage is raised,
wherein when the power consumption of the controller decreases, the feedback voltage is increased to be higher than a standard feedback voltage, and then the feedback voltage decreases to the standard feedback voltage as the input voltage decreases to a first voltage level, and when the power consumption of the controller is raised, the feedback voltage is decreased to be lower than the standard feedback voltage, and then the feedback voltage increases to the standard feedback voltage as the input voltage is raised to second voltage level.

14. The control method of claim 13, further comprising:
changing a resistance value of a resistor circuit by the resistor circuit of the controller when the power consumption changes, so as to change the feedback voltage.

15. The control method of claim 14, further comprising:
raising a resistance ratio value of the resistor circuit when the power consumption is raised, so as to decrease the feedback voltage; and
decreasing the resistance ratio value of the resistor circuit when the power consumption decreases, so as to raise the feedback voltage.

16. The control method of claim 14, further comprising:
adjusting the resistance value of the resistor circuit by a logic control circuit of the controller according to the power consumption.

17. The control method of claim 14, wherein the resistor circuit comprises a first variable resistor and a second variable resistor, wherein the control method further comprises:

raising a ratio value of a first resistance value of the first variable resistor relative to a second resistance value of the second variable resistor when the power consumption of the controller is higher, so that the feedback voltage decreases; and decreasing the ratio value of the first resistance value of the first variable resistor relative to the second resistance value of the second variable resistor when the power consumption of the controller is lower, so that the feedback voltage is raised.

18. The control method of claim 17, wherein a first end of the first variable resistor configured to receive the input voltage, and a second end of the first variable resistor is coupled to an output end; wherein a first end of the second variable resistor is coupled to the output end, and a second end of the second variable resistor is grounded, wherein the output end outputs the feedback voltage.

19. The control method of claim 13, wherein the power consumption comprises a plurality of power consumption levels, the input voltage comprises a plurality of input voltage levels, and each of the plurality of power consumption levels correspond to one of the plurality of input voltage levels.

20. The control method of claim 19, wherein a first power consumption level corresponds to a first input voltage level, and a second power consumption level corresponds to a second input voltage level, wherein the control method further comprises:

adjusting the input voltage from the first input voltage level to the second input voltage level when the power consumption changes from the first power consumption level to the second power consumption level.

* * * * *